Oct. 23, 1951 W. BAKKER 2,572,097
SEPARATOR
Filed Oct. 7, 1948 3 Sheets-Sheet 1

Inventor
Willem Bakker
By Albin F. Knight
Attorney

Oct. 23, 1951  W. BAKKER  2,572,097
SEPARATOR
Filed Oct. 7, 1948  3 Sheets-Sheet 2
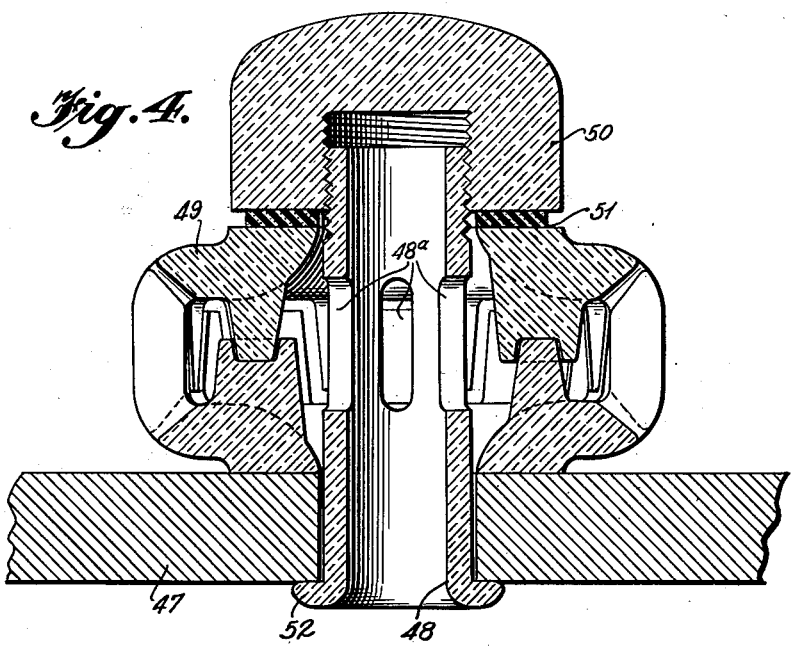
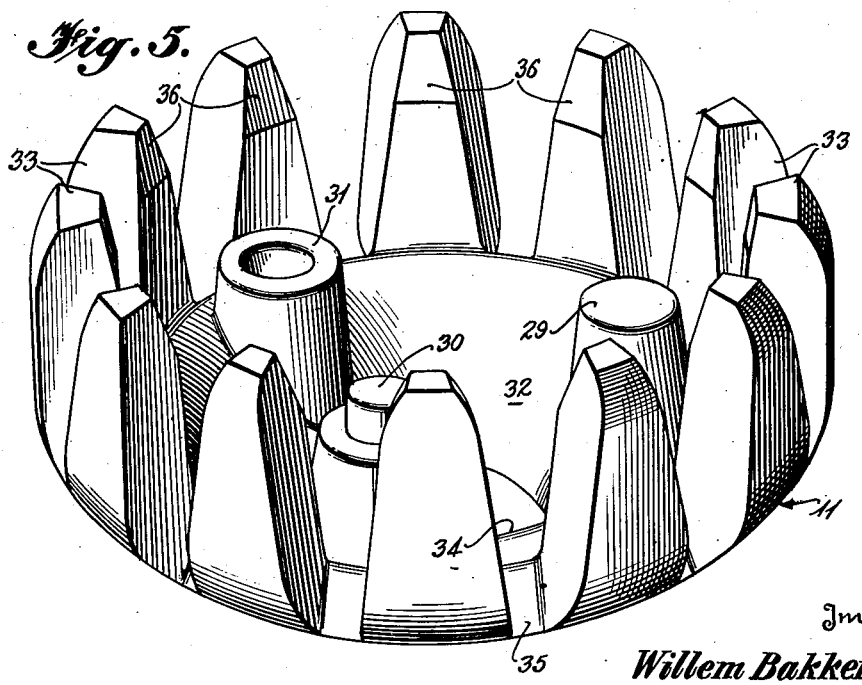
Inventor
Willem Bakker
By Albin F. Knight
Attorney Oct. 23, 1951 W. BAKKER 2,572,097
SEPARATOR
Filed Oct. 7, 1948 3 Sheets-Sheet 3

Inventor
*Willem Bakker*
By *Albin F. Knight*
Attorney

Patented Oct. 23, 1951

2,572,097

UNITED STATES PATENT OFFICE 2,572,097

SEPARATOR

Willem Bakker, Arnhem, Netherlands, assignor to American Enka Corporation, Enka, N. C., a corporation of Delaware Application October 7, 1948, Serial No. 53,300
In the Netherlands January 19, 1948

2 Claims. (Cl. 210—171)

This invention relates to apparatus for the separation of liquids and solids and more particularly to a separating device which may be built up of similar elements and which is characterized by the ease with which it may be cleaned by reversing the flow through the separator.

When filtering liquids through a filter bed, as for example, in water purification, there is usually a device for receiving the liquid after it has been passed through the filter bed. This device is for the purpose of retaining the filter material while permitting the liquid to continue its flow to a point of collection for use. When the filter material in a filter bed becomes choked or dirty, the filter bed is customarily agitated by back-flushing with a fluid such as air, liquid, or the two together. During the back-flushing the separating device associated with the filter must effect a good distribution of the liquid or gas which is used as a flushing medium but which is flowing in the opposite direction to the direction of the liquid which was filtered.

For many years the filter bed of water purification apparatus was provided with a sieve bottom made of wire gauze. In flushing the liquid was passed first through the wire gauze and then into the filter bed while during ordinary filtration the liquid passed first through the filter bed and then out through the interstitial spaces of the screen while the filtering material was held back by the screen. While this arrangement has been widely used it has several important disadvantages. In the first place the distribution of flushing fluid is irregular so that only parts of the filtering material are cleaned and agitated during flushing. Furthermore, the gauze is subject to corrosion and consequently requires frequent replacement which is a time-consuming and expensive operation.

Efforts have been made to avoid the foregoing disadvantage by using porcelain sieves of the type having slits radially disposed from a central hub-like area to which liquid is supplied. These filters have the disadvantage that the radial slits are wider on the outside than at the inside making them difficult to clean. Furthermore, it was not heretofore known to make an inexpensive and easily-assembled filter of the radial slit type.

It is an object of this invention to overcome the foregoing difficulties of the prior art and to provide a sieve having slits which discharge in the direction of the filtration, having slits which are adjustable to size after construction, and characterized by excellent passage and considerable facility in cleansing.

It is proposed according to the present invention to provide a separating or distributing device which can be easily manufactured in a glass ring or mold and which is comprised of two elements so constructed and arranged as to define between them slits which serve to separate solid substances from liquids in the case of filtration and to divide and distribute a liquid or gas stream used as a flushing medium.

As a secondary object of this invention it is proposed to provide a distributing device comprised of two interdigitating elements defining slits bounded by parallel lines.

Other objects and advantages of this invention will be apparent upon consideration of the following detailed description of several embodiments thereof in conjunction with the annexed drawings wherein:

Figure 4 is a view in vertical section showing a modified type of outlet for the distributing device;

Figure 5 is a perspective view of one of the elements of which the distributing device of the preceding figures is constructed;

Figure 1:
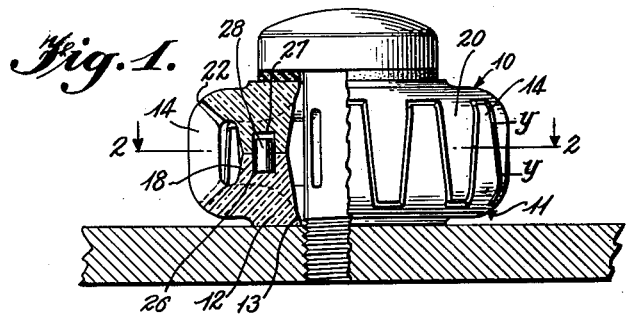
Figure 1 is a view partially in elevation and partially in section of a separating and distributing device constructed in accordance with the principles of the present invention.
Figure 2:
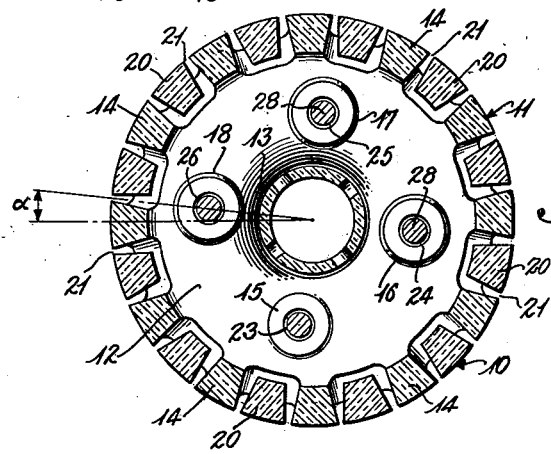
Figure 2 is a horizontal sectional view taken along the line 2—2 of Figure 1.

Referring now in greater detail to Figures 1, 2 and 5 of the drawings, it will be noted that the separating and distributing device of the present invention is comprised of two identical elements 10 and 11. In describing these elements reference will be made to Figure 2 wherein only the element 11 is completely shown, but it will be understood that the description applies with full effect to the element 10. Referring now to Figure 2 it is noted that the element 11 comprises a hub portion 12 having therein a central aperture at 13 and a plurality of teeth 14 which are circumferentially spaced and extend upwardly from the hub 12 in a direction generally normal to the plane of the hub. Within the hub there are provided four protuberances 15, 16, 17 and 18 which lie in generally parallel relationship to the teeth 14 and generally normal to the plane of the hub. In between the teeth 14 there depend the teeth 20 of the element 10. As can be seen upon reference to Figures 1 and 2 the separating and distributing device is constructed by placing two identical elements 10 and 11 in mutually inverted position with the respective teeth interdigitating.

The cross sections of each tooth 14 and 20 are in the form of an isosceles trapezium so that when these teeth are interdigitated slits 21 are defined which also have the shape of isosceles trapezia with the narrow side of the slit facing outwardly of the separating and distributing device. Toward the inside the top flat of the teeth is bevelled with the same slope as that of the sides of the teeth as a result of which after interdigitation a slit 22 is formed which is also generally triangular in shape as can be seen upon reference to Figure 1. If concurrent reference is made to Figures 1 and 2 it will be noted that the protuberances 15, 16, 17 and 18 are each provided with a central cavity at 23, 24, 25 and 26 respectively. Similar cavities are provided in the protuberances of the element 10, only one of which shows in Figure 1 at 27. When the two elements are put together in mutually inverted relationship a guiding pin such as is shown at 28 in Figure 1 is inserted in each of the cavities 23, 24, 25 and 26 and projections above that cavity can be received in the cavities of the protrusions from element 10.

It can therefore be seen that the height of the protrusions of the elements 10 and 11 controls the width of the opening between the teeth.

When, in constructing a separating and distributing device according to the present invention, protrusions are arranged within the annulus defined by the teeth and the two elements 10 and 11 are fully identical it is necessary that the ratio of the number of teeth to the number of protrusions be a whole number. It is also necessary that the protrusions be arranged symmetrically with respect to each other and that the angle alpha (see Figure 2) between the radius through the center of the outer surface of the tooth lying nearest the protrusions be one-quarter of the angle between the radii to said centers of two successive teeth of an element. Thus when there are twelve teeth, there must be two, three, four or six protrusions; in the case of ten teeth, two or five protrusions, etc. The angle alpha between the connecting lines of the center of an element and the center lines of the outer surfaces of two successive teeth amounts to $$\frac{360}{T}$$

when there are T teeth. Consequently the angle alpha amounts to $$\frac{1}{4} \times \frac{360}{T}$$

or $$\frac{90}{T}$$

By the use of identical elements the important advantage is achieved that only one casting or press mold is required for the manufacture of both elements. By this expedient the equality and similarity of the elements is insured and the slits are always equal. Furthermore, the identity of the elements affords a great advantage in the assembly and disassembly of the device and for the replacement of an element in case of breakage.

Figure 3:
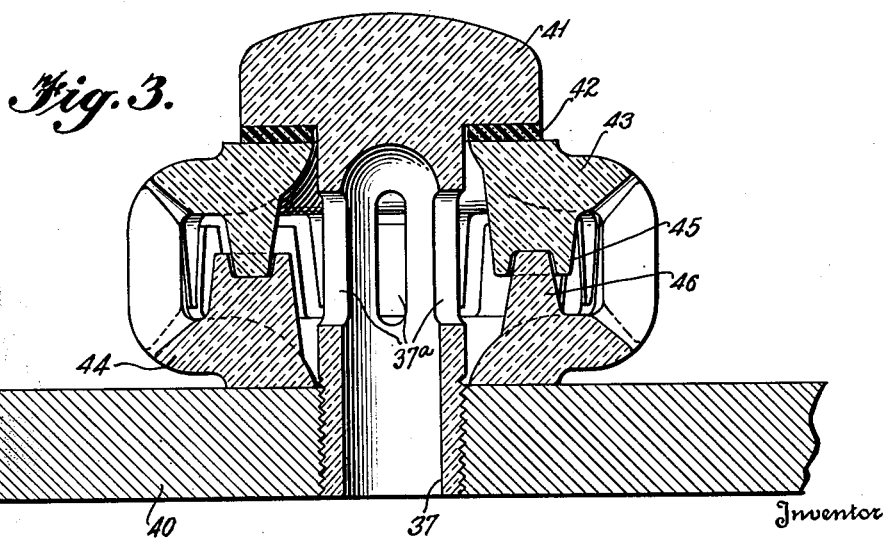
Figure 3 is a vertical sectional view showing one type of outlet for the distributing device.

If now reference is made to Figures 3, 4 and 5, it will be noted that constructions are indicated wherein there are twelve teeth and three protrusions. In this case one of the protrusions 29 will be smooth, another protrusion 30 will be provided with a projection of lesser diameter than the protrusions proper and the third protrusion 31 will be provided with a socket. Thus when one element is placed in mutually inverted position over another the registry is excellent due to the fact that the elements cannot move laterally with respect to one another. The size of the slit between the teeth is fully predetermined and can be decreased at will by grinding off the protrusions. It can be increased by arranging washers between the contacting surfaces of the registrating protrusions. In other respects the disclosure of Figure 5 corresponds to that of Figures 1 and 2. There is a hub portion 32, a plurality of teeth 33 and a central aperture at 34.

By choosing a suitable shape for the cross section of the teeth a slit can be obtained which discharges or has its larger dimension toward the inside of the device. The cross section can have a shape of a trapezium as previously described or may be a half moon or a triangle. Besides a straight shape the sides of the teeth can also have any other shape so long as this does not give rise to difficulties during the molding and pressing of the elements. In practice it has been found desirable so to construct the teeth that the slits at their entrance and/or exit are bounded by parallel lines such as are indicated at y—y in Figure 1.

With the device according to the present invention a very narrow slit can be achieved and yet this slit can be easily cleaned when the elements are dismantled so that the spaces between the teeth are very substantial. The possibility for range of adjustment of the slit opening is determined by the slope of the sides of the teeth. As has been mentioned above the width of the slit can be determined by the height of the protuberances and this may be fully predetermined during manufacture. It is possible, however, to change a ready cast element at will by grinding off the teeth as well as the protrusions and this was not possible in constructions prior to the present invention.

It is also possible to use instead of protrusions as uninterrupted collar having apertures therein. Preferably, however, protuberances would be arranged to coact with sockets on the surfaces of collars which are to be butted together in order to insure centering of the elements during assembly. The slits of the device of the present invention have very substantial length with respect to the surfaces of the device due to the nature of the slit line which can be seen very clearly at the right side of Figure 1. Furthermore, the element is constructed in such a way that during flushing, that is, during the streaming of liquid from the interior to the exterior of the device, the element is sprayed in many directions. In Figure 5 the champferings 35 at the sides of the spaces between the teeth have been arranged in such a way that with the bevelled inner surfaces 36 of the teeth 33 a slit is obtained which runs almost vertical. The angle of the flat 36 with the horizontal and that of the flat 35 with respect to the horizontal must be equal again with the angle of the sides of the teeth with the horizontal. Here, however, the teeth have a curved outer surface or at least are bent at their upper and lower extremities.

Figures 3 and 4 illustrate two alternative constructions for the connection of two elements together. In Figure 3 a hollow glass screw bolt 37 is shown which can be used to fasten the device to the bottom of a filter 40 by operation of its threaded shank. The screw bolt is provided with four ports 37a leading radially to the interior of the device and with a head 41 which, through a gasket 42, bears against the top of the device. The upper element of the device bears reference numeral 43 in Figure 3, while the lower element thereof bears reference numeral 44. The teeth and slits correspond to the disclosure heretofore made and the protuberances as illustrated include one at 45 having a central socket and one at 46 having a projecting portion engaging the socket.

In Figure 4 a hollow collar bolt is shown for attaching the device to a filter bottom or the like. The filter bottom is indicated at 47, the hollow collar bolt is represented by the numeral 48 and the device is generally indicated at 49. In this case the upper surface of the collar bolt is externally threaded for coaction with an internally threaded cap 50 which in threaded engagement with the collar bolt compresses a washer 51 to bear down on top of the device 49. The collar bolt has a flange at 52 which engages the inner surface of the filter bottom. The collar bolt is provided with radial slits 48a similar in structure and function to the slits 37a of Figure 3.

In discussing the invention as it is shown in Figures 1 to 5 inclusive, reference has been made to but a single device constructed of two elements. Actually the devices can be arranged serially or as a single unit depending upon the capacity which it is intended to handle.

Figure 6:
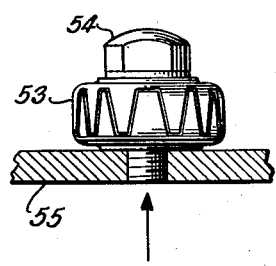
Figure 6 is a view in elevation of a single distributing device according to the present invention in a vertical position of operation.

In Figure 6 there is shown a device 53 according to the invention provided with a screw bolt 54 similar in structure and function to the bolt 41 of Figure 3. The filter bottom is represented at 55 and the liquid discharging from the filter flows in the direction of the arrow into the hollow screw bolt and radially out through the slits of the device 51.

Figure 7:
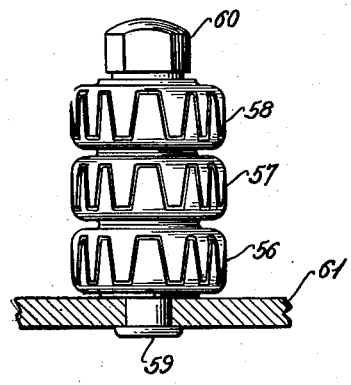
Figure 7 is a view similar to Figure 6 but demonstrating the operation of a plurality of devices of the type of Figure 6 arranged for series operation in a vertical group.

In Figure 7 there is shown a construction involving three serially arranged devices 56, 57 and 58 which are held by a collar bolt 59 and a cap 60 in stacked relationship with respect to a filter bottom 61. The operation is similar to that previously described.

Figure 8:
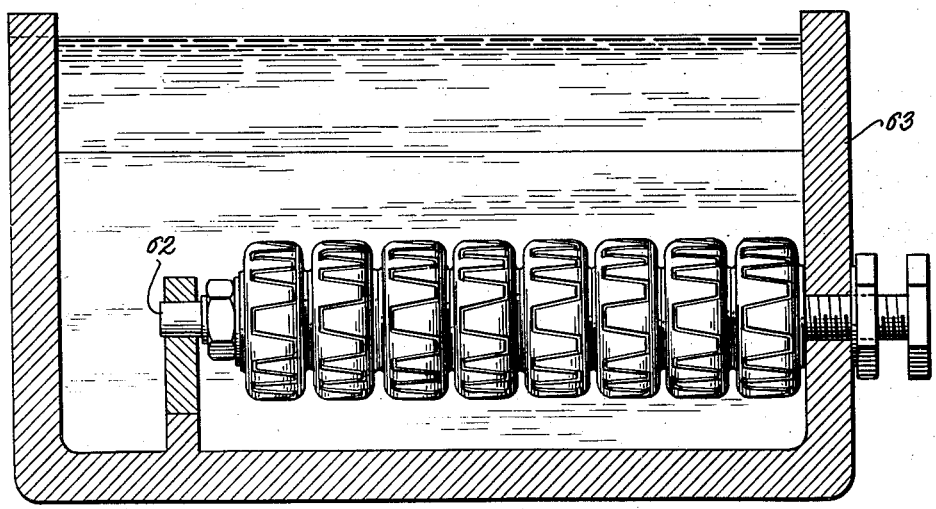
Figure 8 is a view partially in elevation and partially in section of a stack of horizontally arranged distributing devices according to the present invention as they appear in conjunction with filtration apparatus.

In Figure 8 eight units are shown mounted on a tube 62 which passes through the wall 63 of a water purification plant. The number of units on any tube can be increased or decreased at will and several such sets can be mounted near the bottom of a purification plant.

The water purification device according to the present invention is manufactured from glass. For other purposes, as for example atomizing a liquid for evaporation and mixing purposes the device can be made from any material suitable to the liquid or gas which it is going to handle. For example, the device can be used for the drying of steam. In that case the steam to be dried is led from the exterior to the interior of the device and water drops present in the steam are retained by the slit.

While the invention has been described with reference to various embodiments thereof, it is to be understood that the description is exemplary in nature for the purpose of instructing those skilled in the art how the invention may be made. It is to be understood, however, that various modifications of the structure shown are comprehended within the scope of the invention as defined in the appended claims.

What is claimed is:

1. A separating device for use with filters or the like comprising a pair of identical elements; each having a central hub portion defining a central passageway, a plurality of teeth integral with the hub portion and arranged in circumferentially spaced relation extending in a common direction generally normal to the hub portion, and a plurality of integral protuberances extending from the hub within the space defined by the teeth; said elements being arranged in mutually inverted relation with their teeth interdigitating and said protuberances interlocking to control the axial and circumferential spacing between the interdigitating teeth.

2. A separating device for use with filters or the like comprising a pair of identical elements each having a central hub portion defining a central passageway, a plurality of teeth arranged in circumferentially spaced relation extending in a common direction generally normal to the hub portion and a plurality of protuberances extending from the hub within the space defined by the teeth; said elements being arranged in mutually inverted relation with their teeth interdigitating and said protuberances interlocking to control the spacing between the interdigitating teeth, said protuberances being arranged symmetrically with respect to each other in such relation that a line connecting the center of the element with the center line of each of its protuberances defines with a line connecting the center of the element with the center of the outer surface of a tooth lying nearest the respective protuberance an angle which is one-fourth the magnitude of the angle defined between a line connecting the center of the element with the outer surface of a tooth and a line connecting the center of the element with the outer surface of the next adjacent tooth.

WILLEM BAKKER.

REFERENCES CITED

The following references are of record in the file of this patent:

UNITED STATES PATENTS

| Number | Name | Date |
| --- | --- | --- |
| 1,588,620 | Ryan | June 15, 1926 |
| 2,234,678 | Matson | Mar. 11, 1941 |
| 2,495,996 | Wolcott | Jan. 31, 1950 |